United States Patent [19]
Kuo et al.

[11] Patent Number: 5,369,529
[45] Date of Patent: Nov. 29, 1994

[54] REFLECTIVE OPTOELECTRONIC INTERFACE DEVICE AND METHOD OF MAKING

[75] Inventors: Shun-Meen Kuo, Chandler; Christopher K. Y. Chun, Mesa; Michael S. Lebby, Apache Junction, all of Ariz.

[73] Assignee: Motorola, Inc., Schaumburg, Ill.

[21] Appl. No.: 95,452

[22] Filed: Jul. 19, 1993

[51] Int. Cl.[5] ............... G02B 27/00; G02B 6/32
[52] U.S. Cl. .................... 359/858; 250/551; 257/678; 385/130; 385/15
[58] Field of Search ............ 350/96.12, 96.15, 96.20, 350/96.17, 96.18, 96.23, 96.11, 96.1; 250/551; 359/858; 257/678

[56] References Cited

U.S. PATENT DOCUMENTS

| | | | |
|---|---|---|---|
| 4,438,338 | 3/1984 | Stitt et al. | 250/551 |
| 4,789,214 | 12/1988 | Vilhelmsson et al. | 350/96.15 |
| 4,826,272 | 5/1989 | Pimpinella et al. | 350/96.20 |
| 4,890,895 | 1/1990 | Zawracky et al. | 350/96.12 |
| 4,943,136 | 7/1990 | Popoff | 350/96.16 |
| 5,093,879 | 3/1992 | Bregman et al. | 385/93 |

*Primary Examiner*—Viet Q. Nguyen
*Attorney, Agent, or Firm*—Gary F. Witting

[57] ABSTRACT

An interconnect substrate with a surface having a plurality of electrical tracings is provided. A photonic device having a working portion and contact electrically coupled to one of the plurality of electrical tracings is disposed on the interconnect substrate. A molded optical portion is formed that encapsulates the photonic device, as well as forming a reflective surface that directs light between an external light communicating structure and the photonic device.

20 Claims, 2 Drawing Sheets

REFLECTIVE OPTOELECTRONIC INTERFACE DEVICE AND METHOD OF MAKING

BACKGROUND OF THE INVENTION

This invention relates, in general, to fabrication of optical devices and, more particularly, to fabrication of a reflective optoelectronic interface device.

This application is related to copending application that bears Ser. No. 07/889,335, titled MOLDED WAVEGUIDE AND METHOD OF MAKING SAME, filed on May 28, 1992.

At present, coupling of an optical fiber having a core region to a photonic device is a difficult task that typically is achieved by either a manual method or semi-automatic method. Generally, both the manual and the semi-automatic methods are complex, inefficient, and are not suitable for high volume manufacturing.

For example, a major problem associated with the coupling of the optical fiber to the photonic device is alignment of the working portion of the photonic device to the core region of the optical fiber or vice versa. Moreover, it should be pointed out that the working portion of the optical fiber generally is required to be not only perpendicular but also to be within an area described by the working portion of the photonic device so as to allow light that is either transmitted or received by the photonic device to be efficiently and effectively coupled to the core region of the optical fiber, thereby necessitating extremely tight alignment tolerances between the working portion of the photonic device and the core region of the optical fiber. By necessitating the extremely tight alignment tolerances between the working portion of the photonic device and the core region of the optical fiber, a cost is incurred which drives up the manufacturing cost of a device which couples the photonic device to the core region of the optical fiber.

Presently, coupling of the working portion of the photonic device and the core region of the optical fiber typically is achieved by actively aligning both the photonic device and the optical fiber. For example, with the photonic device being a laser and with the optical fiber having an optical detector coupled to one end of the optical fiber, the Laser is activated and the other end is carefully moved or adjusted until the core region of the optical fiber is aligned to the working portion of the laser so that a maximum output of light is captured by the core region of the optical fiber as indicated by the photodetector. However, many problems arise by aligning the photonic device and the core region of the optical fiber by active alignment or by hand, such as being extremely labor intensive, being costly, having a potential of poor accuracy of alignment, and the like. Further, if the misalignment is severe enough, unsuitable product is manufactured, thus increasing costs and reducing manufacturing capacity and capability. It should be understood that having the aforementioned problems are not amenable to high volume manufacturing environment.

It can be readily seen that the present methods for aligning a photonic device to an optical fiber have severe limitations. Also, it is evident that the present fabrication methods for interconnection methods for coupling a photonic device to an optical fiber are not only complex and expensive, but also non amenable to high volume manufacturing. Therefore, an article and a method for interconnecting or coupling a photonic device to an optical fiber that is cost effective, simplistic, and manufacturable in a high volume manufacturing setting is highly desirable.

SUMMARY OF THE INVENTION

Briefly stated, an interconnect substrate having a surface with a plurality of electrical tracings disposed on the surface of the interconnect substrate is provided. A photonic device having a working portion and having at least a contact is electrically coupled to one of the plurality of electrical tracings disposed on the interconnect substrate. A molded optical portion is formed that encapsulates the photonic device, as well as forming a reflective surface that directs light between an external light communicating structure and the photonic device.

An advantage of the present invention is to relax alignment tolerances between a working portion of a photonic device and a core region of an optical fiber.

Another advantage of the present invention is to provide an optoelectronic interface that is highly manufacturable.

DETAILED DESCRIPTION OF THE DRAWINGS

Figure 1:
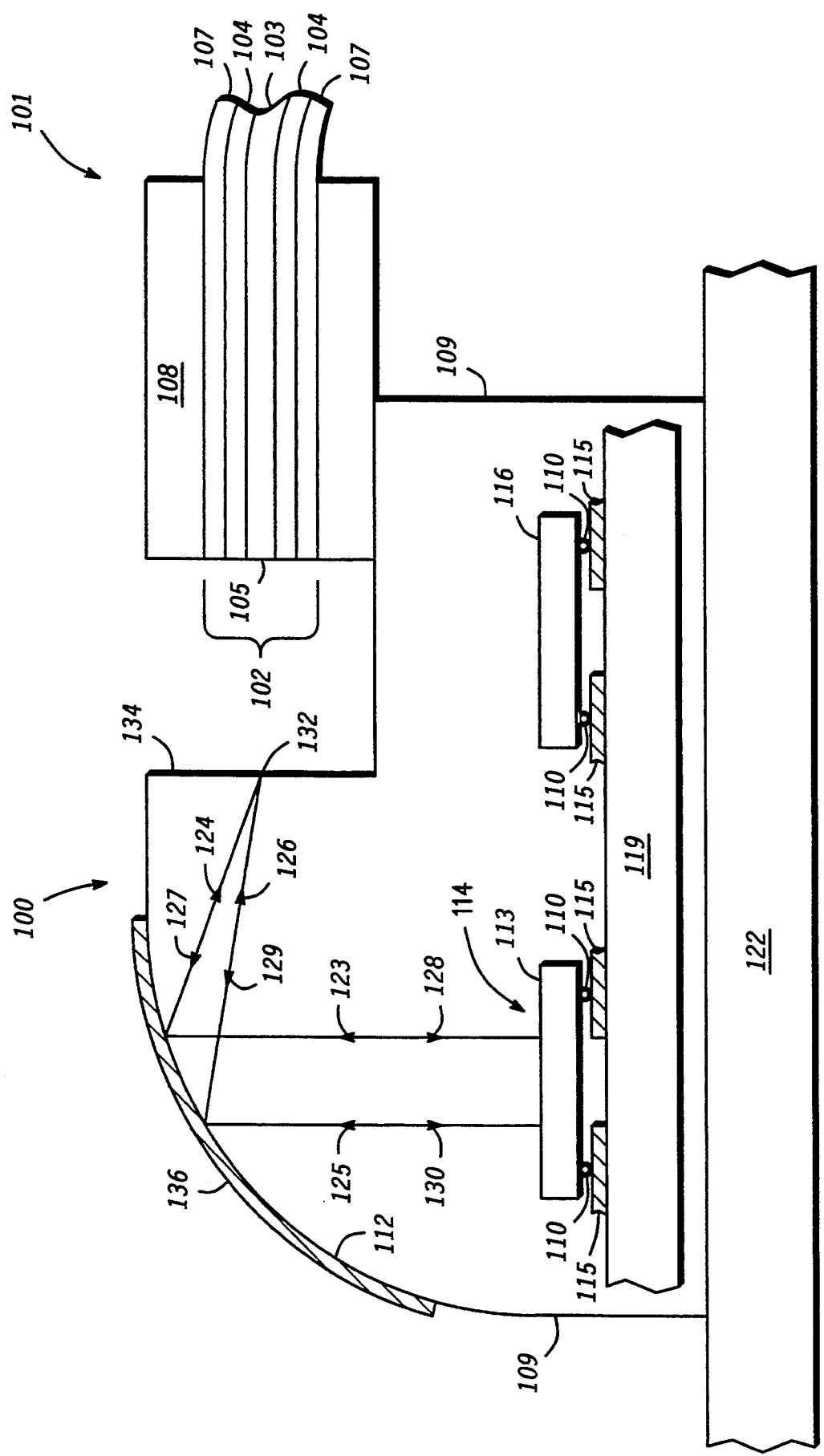
FIG. 1 shows a greatly enlarged simplified cross-sectional illustration of a reflective optoelectronic interface device.
Figure 2:
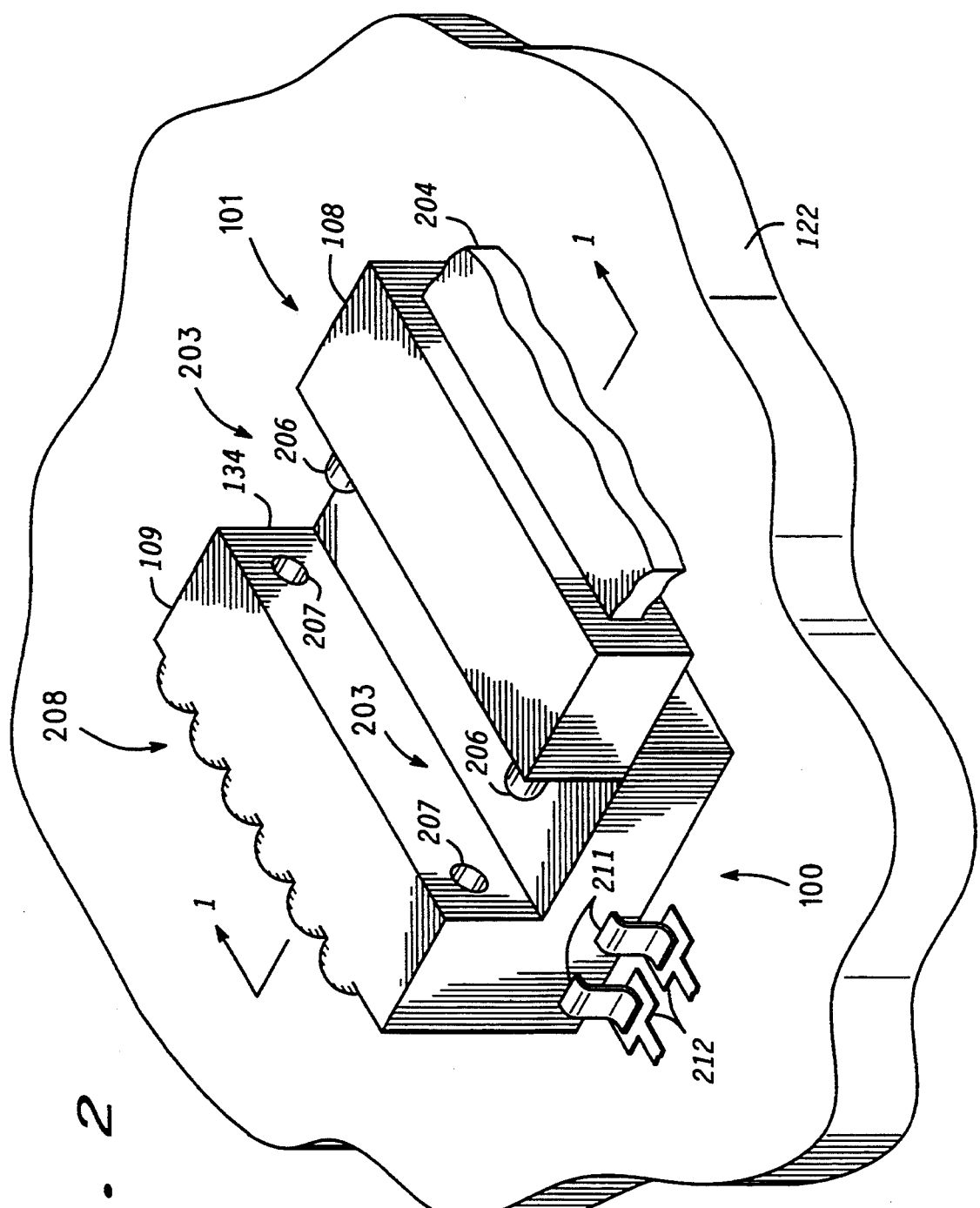
FIG. 2 shows an enlarged simplified perspective illustration of a reflective optoelectronic interface device mounted on an interconnect substrate.

Referring now to both FIG. 1 and FIG. 2, FIG. 1 shows a greatly enlarged simplified cross-sectional illustration of a reflective optoelectronic interface device 100 and FIG. 2 shows an enlarged perspective illustration of reflective optoelectronic interface device 100 mounted on a portion of an interconnect substrate 122.

As illustrated in FIG. 1, an optical connector 101 is shown having an optical fiber 102 with a core region 103 surrounded by a cladding region 104 that is encased in a protective covering 107. It should be understood by one of ordinary skill in the art that protective covering 107 is capable of being stripped back in such a manner that a portion of optical fiber 102 is capable of being bared. It should be further understood that surface 105 of optical fiber 102 is prepared by well-known methods in the art so as to enable light signals to be transmitted from surface 105 oil optical fiber 102. A body 108 holds optical fiber 102 in a fixed spatial orientation with reference to body 108, as well as enabling optical connector 101 having body 108 to be detachably engaged with a molded optical portion 109 by an alignment device 203 (see FIG. 2).

Further, reflective optoelectronic interface device 100, illustrated in cross-sectional view, reveals molded optical portion 109 having a reflective surface 112, a photonic device 113 having a working portion 114, a plurality of electrical tracings 115, an integrated circuit 116, and interconnect substrates 119 and 122.

It should be understood that FIG. 1 is a cross-sectional view taken through 1—1 of FIG. 2. Additionally, it should be further understood that reflective optoelectronic interface device 100 can extend not only into and out of the drawing, but also latterly across the drawing. Further, while only a single optical fiber 103, a single reflective surface 112, a single photonic device 113, and a single integrated circuit 116 are shown in FIG. 1, it should be understood that arrays of optical fibers, reflective surfaces, photonic devices, and integrated circuits are capable of being present in reflective optoelectronic interface device 100. In the present invention, a novel article and a novel combination of elements and processes are described that allow for accurate and efficient interconnection or coupling of optical connector 101 having optical fiber 102 to photonic device 113 with reflective surface 112.

Generally, interconnect substrates 119 and 122 are capable of being any suitable well-known interconnect substrate, such as a printed circuit board, a ceramic interconnect substrate, printed wire board, or the like. Typically, interconnect substrates 119 and 122 provide a plurality of electrically conductive pathways or electrical tracings, represented by electrical tracings 115 and 212 (see FIG. 2) on interconnect substrates 119 and 122, respectively. Both electrical tracings 115 and 212 are capable of electrically interconnecting a variety of electronic components, such as integrated circuit 116 as shown in FIG. 1, and a variety of other electrical components (not shown) such as other integrated circuits, resistors, capacitors, and the like that can be found on both interconnect substrates 119 and 122.

Photonic device 113 is capable of being either a phototransmitter or a photoreceiver that either emits light or receives light, respectively, as indicated by arrows 123 through 126, and arrows 127 through 130, respectively. When photonic device 113 is a phototransmitter, the phototransmitter is capable of being any suitable light emitting device, such as a light emitting diode (LED), a vertical cavity surface emitting laser (VCSEL), or the like. Further, when photonic device 113 is a photoreceiver, photonic device 113 is capable of being any suitable light receiving device, such as a photodiode, a p-i-n photodiode, or the like. However, in a preferred embodiment of the present invention, when photonic device 113 is a phototransmitter, and when photonic device 113 is a photoreceiver, photonic device 113 is either a vertical cavity surface emitting laser (VCSEL) or a p-i-n photodiode, respectively.

Generally, photonic device 113 and integrated circuit 116, and the variety of other electronic component are made separately and subsequently electrically and mechanically joined or molded to electrical tracings 115 and 212 by any suitable well-known method, such as manually, semi-automatically, or fully automatically. However, photonic device 113, integrated circuit 116, and the variety of other electronic components preferably are joined or mounted to electrical tracings 115 and 212 using an automatic system such as a robotic arm (not shown), thereby ensuring precise and accurate placement or mounting of photonic device 113, integrated circuit 116, and the variety of electronic components on tracings 115.

Generally, molded optical portion 109 is made utilizing the teachings of copending application that bears Ser. No. 07/889,335, titled MOLDED WAVEGUIDE AND METHOD OF MAKING SAME, filed on May 28, 1992.

Briefly, molded optical portion 109 is made of any suitable optical material, such as plastics, epoxies, polymers, or the like. Generally, material selected for molded optical portion 109 has a refractive index ranging from 1.4 to 1.7.

In the present invention, prepared interconnect substrate 119 having at least photonic device 113 mounted thereon and operably coupled to electrical tracings 115 is placed into a mold (not shown) and overmolded with molded optical portion 109. Reflective portion or reflective surface 112 is molded simultaneously with molded optical portion 109, thereby positioning reflective surface 112 in relation to photonic device 113 so as to guide light, indicated by arrows 123-130 through optical portion 109 to a position 132. A surface or light input/output surface 134 is molded simultaneously with molded optical portion 109, thus providing an optical interconnect surface with position 132 so as to enable operable coupling of core region 103 of optical connector 101.

Alignment apparatus 203, as shown in FIG. 2, is capable of being made by a suitable configuration, such as a ferrule and pin arrangement, interlocking portions, or the like. Additionally, alignment apparatus 203 is made by any suitable method, such as molding, precision milling, laser ablating, or the like. However, in a preferred embodiment of the present invention, alignment ferrules 207 are molded simultaneously with molded optical portion 109, thereby providing alignment of working portion 114, reflective surface 112, and alignment ferrules 207 to each other. Accordingly, alignment of core region 103 of optical connector 101 to working portion 114 is provided by alignment pins 206 that engage alignment ferrules 207, thereby allowing light, represented by arrows 124-130, to be reflected off of reflective surface 112 of molded optical portion 109. Additionally, it should be understood that materials used for molded optical portion 109 are optically clear with refractive indexes that are similar to refractive indexes of optical fiber 102, thereby allowing reflective surface 112 to internally reflect the light, indicated by arrows 123-130 to either position 132 or working portion 114, thereby allowing light to enter core region 103 or leave core region 103 effectively and efficiently.

Reflective surface 112 is capable of being molded or formed into any suitable reflective surface, such as a flat surface, a curved surface, a diffraction grating, a holographic surface, or the like. However, in a preferred embodiment of the present invention, reflective surface 112 is molded or formed as a parabolic curve or a partial parabolic curve. Generally, with reflective surface 112 being shaped as a parabolic surface or a partial parabolic curve, reflective surface 112 directs light, indicated by arrows 123-130, to position 132 or to working portion 114 of optical portion 109.

For example, with photonic device 113 being a phototransmitter having working portion 114, the light, represented by arrows 125 and 123, that is emitted from working portion 114 is reflected off reflective surface 112, represented by arrows 124 and 127, toward position 132 of optical portion 109. Further, with photonic device 113 being a photoreciever having working portion 114 and with core region 103 being abbutted against surface or light input/output surface 134, the light, represented by arrows 127 and 129, that is emitted from core region 103 into optical portion 109 is reflected off reflective surface 112, represented by arrows 128 and 130, toward working portion 114 of photonic device 113. Having reflective surface 112 being parabolically shaped or a portion thereof, guides light, represented by arrows 124-130, to there desired locations even with slight misalignments of photonic device 113 or core region 103, thus relaxing alignment tolerances of both photonic device 113 and core region 103. Thus by shaping reflective surface 112 to form a parabolically shaped reflective surface or a portion thereof, alignment tolerances are greatly relaxed, thereby providing a more manufacturable and cost effective interface between core region 103 and photonic device 113.

Additionally, layer 136 is capable of being formed adjacent to reflective surface 112. Generally, layer 136 is made of any suitable reflective material, such as gold, silver, aluminum, or the like. Providing layer 136 on reflective surface 112, optimizes reflectance of light off surface 112, thereby increasing an intensity of light either going to working portion 114 or going to core region 103 of optical fiber 102.

Electrical signals that either stimulate working portion 114 of photonic device 113 or electrical signals that are elicited from light stimulating working portion 114 of photonic device 113 are sent through electrical tracings 115. As previously indicated, electrical tracings 115 are made of any suitable well-known method in the art. The electrical signals are then passed through conductive bumps 110 that are made of any suitable well-known material, such as solder bumps, gold bumps, conductive epoxy bumps, or the like. However in a preferred embodiment of the present invention gold bumps are used to provide a secure mechanical and electrical connection between electrical tracings 115 and both photonic device 113 and integrated circuit 116.

Optical connector 101 is made such that optical fiber 102 is held in a fixed position in relation to alignment devices 203, as shown in FIG. 2. In a preferred embodiment of the present invention, optical connector 101 is detachably engaged with surface 134 of molded optical portion 109, thereby bringing core region 103 and position 132 together so as to provide an operably connected optical interface between core region 103 and working portion 114 of photonic device 113. In the present invention, use of reflective surface 112 to reflect light from working portion 114 into core region 103 of optical fiber 102 or to reflect light from core region 103 of optical fiber 102 into working portion 114 of photonic device 113, substantially relaxes alignment tolerances of both photonic device 113 and core region 103 of optical connector 101, thereby providing a more manufacturable reflective optoelectronic interface device which does not require active alignment.

Referring now more specifically to FIG. 2, an enlarged simplified perspective view of reflective optoelectronic interface device 100 mounted on interconnect substrate 122 is illustrated. As can be seen in FIG. 2, optical connector 101 is made having a plurality of optical fibers in an optical cable 204 that are positioned ant fixed by body 108 of optical connector 101. It should be understood that similar features as presented in FIG. 1 will retain their original identifying numerals. Further, optical connector 101 is made with alignment devices that are detachably engaged with alignment devices of molded optical portion 109. In a preferred embodiment of the present invention, the alignment devices and alignment devices are pins 206 and openings 207, respectively, thereby fixing spatial arrangements of core region 103 to surface 134.

Reflective optoelectronic interface device 101 is made in a similar manner as previously described hereinabove. However, as can be seen in FIG. 2, a plurality of reflective surfaces 208 are molded simultaneously with molded optical portion 109, thereby enabling the plurality of optical fibers found in optical cable 204 to be aligned to working portion 114 of photonic device 113.

Members 211 are input and output leads that enable electrical communication between external electronics, such as interconnect board 122, and electrical tracings 115 on interconnect board 119. Typically members 211 are lead frame members that are molded simultaneously with molded optical portion 109, thereby allowing electrical communication or transference of signals into and out of reflective optoelectronic interface device 100. Members 211 are capable of being formed and electrically and mechanically interconnected to electrical tracing 212 of interconnect substrate 122 by any suitable method well known in the art, such as tab, wire bonding, or the like. It should be understood that interconnect substrate 122 has been greatly simplified and that many standard electronic components such as integrated circuits, resistors, transistors, capacitors, and the like have not been shown in this illustration; however, it should be understood by one of ordinary skill in the art that these standard electronic components are capable of being integrated into interconnect substrate 122, as well as having outputs of interconnect substrate 122 being further connected to other interconnect substrates 122.

By now it should be appreciated that a novel reflective optoelectronic interface device and method of making same has been described. The reflective optoelectronic interface device incorporates a reflective surface into an optical portion that encapsulates a photonic device such that light either being emitted or received from the photonic device may be operably coupled to a core region of an optical fiber. Further, use of the reflective surface relaxes alignment tolerances that enable cost effective manufacturing. Additionally, the method of making the reflective optoelectronic interface device allows for incorporation of standard electronic components with photonic devices in a highly manufacturable process.

What is claimed is:

1. A reflective optoelectronic interface comprising:
    a photonic device having a working portion, the photonic device including a contact electrically coupled to an electrical tracing of an interconnect substrate; and
    a molded optical portion that encapsulates the photonic device, the molded optical portion forming a curved reflective surface and a light input/output surface molded therein, the curved reflective surface being positioned to direct light between the input/output surface and the photonic device.

2. A reflective optoelectronic interface as claimed in claim 1 wherein the photonic device is an optical transmitter.

3. A reflective optoelectronic interface as claimed in claim 2 wherein the optical transmitter is an VCSEL.

4. A reflective optoelectronic interface as claimed in claim 2 wherein the optical transmitter is an LED.

5. A reflective optoelectronic interface as claimed in claim 1 wherein the photonic device is an optical receiver.

6. A reflective optoelectronic interface as claimed in claim 5 wherein the optical receiver is an photodiode.

7. A reflective optoelectronic interface as claimed in claim 6 wherein the photodiode is a p-i-n photodiode.

8. A reflective optoelectronic interface as claimed in claim 1 further comprising a layer formed on the curved reflective surface that is made of a reflective material.

9. A reflective optoelectronic interface as claimed in claim 1 wherein the curved reflective surface has a parabolic shape that directs the light toward the photonic device.

10. A reflective optoelectronic interface as claimed in claim 1 further comprising a reflective metal material applied to the curved reflective surface, thereby increasing the curved incidence of reflection of the reflective surface.

11. A reflective optoelectronic interface as claimed in claim 1 including in addition an alignment apparatus.

12. An optoelectronic interface as claimed in claim 11 wherein the alignment apparatus of the molded optical portion is molded.

13. A reflective optoelectronic interface as claimed in claim 1 further comprising an optical connector including an optical fiber and an alignment apparatus, the optical connector fixing and positioning the optical fiber in relation to the alignment apparatus of the optical connector such that mating of the alignment apparatus of the molded optical portion and the alignment apparatus of the optical connector aligns the optical fiber to the curved reflective surface molded in the molded optical portion.

14. A reflective optoelectronic interface as claimed in claim 1 wherein the photonic device is formed as an array of photonic devices.

15. An optoelectronic interface as claimed in claim 14 further comprising an optical connector including an optical fiber bundle and an alignment apparatus, the optical connector fixing and positioning the optical fiber bundle in relation to the alignment apparatus of the optical connector such that mating of the alignment apparatus of the molded optical portion and the alignment apparatus of the optical connector aligns each individual optical fiber of the optical fiber bundle to the curved respective individual reflective surfaces that are molded in the molded optical portion.

16. An optoelectronic package for coupling an optical fiber to a photonic device comprising:
an interconnect substrate having a surface with a plurality of electrical tracings disposed on the surface of the interconnect substrate;
a plurality of external leads, wherein one of the external leads is electrically and mechanically coupled to one of the electrical tracing on the surface of an printed circuit board;
an integrated circuit having a plurality of leads mounted on the printed circuit board, wherein one of the plurality of leads is electrically and mechanically coupled to one of the electrical tracings on the surface of the printed circuit board;
a photonic device having a working portion mounted on the interconnect substrate, wherein the working portion operably coupled to an electrical tracing on the interconnect substrate; and
a molded optical portion that encapsulates the photonic device, the molded optical portion being formed to include a light input/output surface and a curved reflective surface molded therein to direct light between the photonic device and the light input/output surface, and having an alignment apparatus molded therein.

17. A optoelectronic package for coupling an optical fiber to a photonic device as claimed in claim 16 wherein the photonic device is formed as an array of photonic devices.

18. An optoelectronic package for coupling an optical fiber to a photonic device as claimed in claim 17 further comprising an optical connector including an optical fiber bundle and an alignment apparatus, the optical connector fixing and positioning the optical fiber bundle in relation to the alignment apparatus of the optical connector such that mating of the alignment apparatus of the molded optical portion and the alignment apparatus of the optical connector aligns each individual optical fiber of the optical fiber bundle to the curved reflective surface molded in the molded optical portion.

19. A method for making an optoelectronic interface comprising the steps of:
providing an interconnect substrate having a surface with a plurality of electrical tracings disposed on the surface of an interconnect;
mounting a photonic device having a working portion and having a contact electrically coupled to an electrical tracing of the interconnect substrate; and
molding an optical portion having an alignment apparatus with the molded optical portion encapsulating the photonic device, the molded optical portion forming a curved reflective surface molded therein and a light input/output surface, the curved reflective surface directing light between the photonic device and the light input/output surface.

20. An optoelectronic package for coupling an optical fiber to a photonic device comprising:
an interconnect substrate having a surface with a plurality of electrical tracings disposed on the surface of the interconnect substrate;
a plurality of external leads, wherein one of the external leads is electrically and mechanically coupled to one of the electrical tracing on the surface of an printed circuit board;
an integrated circuit having a plurality of leads mounted on the printed circuit board, wherein one of the plurality of leads is electrically and mechanically coupled to one of the electrical tracings on the surface of the printed circuit board;
a photonic device having a working portion mounted on the interconnect substrate, wherein the working portion operably coupled to an electrical tracing on the interconnect substrate; and
a molded optical portion that encapsulates the photonic device, the molded optical portion being formed to include a light input/output surface and a parabolically shaped reflective surface molded therein to direct light between the photonic device and the light input/output surface, and having an alignment apparatus molded therein.

* * * * *